United States Patent [19]

Weigle et al.

[11] 4,104,631

[45] Aug. 1, 1978

[54] METHOD AND SYSTEM FOR CLUTTER BLANKING IN A RADAR TARGET PROCESSOR

[75] Inventors: Wayne L. Weigle, Ellicott City; Edgar L. Fogle, Severna Park; Oscar M. Cromer, Baltimore; Larry C. Schafer, Glen Burnie, all of Md.

[73] Assignee: Westinghouse Electric Corp., Pittsburgh, Pa.

[21] Appl. No.: 672,823

[22] Filed: Apr. 1, 1976

[51] Int. Cl.² .............................................. G01S 7/44
[52] U.S. Cl. ................................. 343/7 A; 343/5 DP
[58] Field of Search ............................ 343/5 DP, 7 A

[56] References Cited

U.S. PATENT DOCUMENTS

| | | | |
|---|---|---|---|
| 3,720,942 | 3/1973 | Wilmot et al. | 343/7 A X |
| 3,742,500 | 6/1973 | Freedman | 343/5 DP X |
| 3,987,442 | 10/1976 | McLeod, Jr. | 343/5 DP X |
| 4,031,364 | 6/1977 | Wilmot | 343/7 A X |
| 4,058,809 | 11/1977 | Chudleigh, Jr. | 343/7 A |
| 4,064,511 | 12/1977 | Manfanovsky | 343/7 A |

*Primary Examiner*—T.H. Tubbesing
*Attorney, Agent, or Firm*—H. W. Patterson

[57] ABSTRACT

In a radar system such as Doppler radar, clutter is eliminated without a requirement for somewhat sensitive frequency spectrum positioning. Processed returns are integrated over different halflook periods, where a look period is a period of constant pulse repetition frequency, and multiplexed into a postprocessor. The postprocessor measures the presence of clutter, and provides a blanking signal for clutter returns during portions of an operating cycle corresponding to clutter peaks.

7 Claims, 9 Drawing Figures

POST DETECTION MODULE

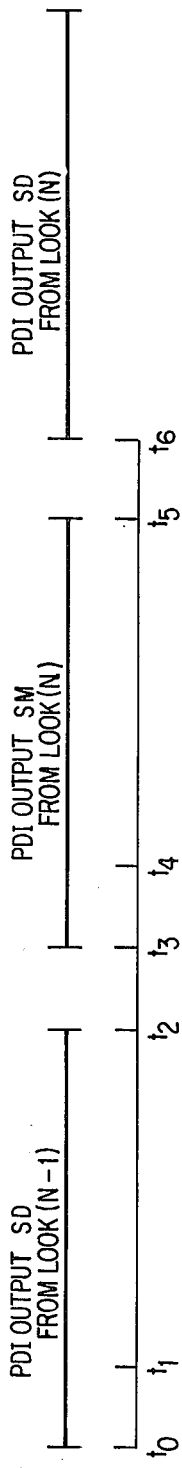
LOOK = PERIOD OF CONSTANT PRF ; DWELL = 3DB ANTENNA BEAM WIDTH
FIG. 3a  LOOK N
FIG. 3b  1st. HALF LOOK | 2nd. HALF LOOK
FIG. 3c  BLANK 3 | VALID 32 IPPS | BLANK 3 | VALID 32 IPPS
FIG. 3d  LOAD BUFFER-1 | LOAD BUFFER-2
FIG. 3e  READ BUFFER-1 | READ BUFFER-2
FIG. 3f  PDI OUTPUT SD FROM LOOK (N-1) | PDI OUTPUT SM FROM LOOK (N) | PDI OUTPUT SD FROM LOOK (N)
$t_0$ $t_1$ $t_2$ $t_3$ $t_4$ $t_5$ $t_6$

METHOD AND SYSTEM FOR CLUTTER BLANKING IN A RADAR TARGET PROCESSOR

BACKGROUND OF THE INVENTION

1. Field of the Invention

This invention relates to radar signal processing systems, and more particularly, to a novel method and system for eliminating clutter in a radar return or echo signal.

2. State of the Prior Art

It is common practice to remove clutter, e.g., reflections from the ground received by an airborne radar system, by means of various types of well-known canceller circuits. For example, one known manner of eliminating main beam clutter (MBC) is to use a fixed frequency rejection filter in the canceller circuit to reject the main beam clutter. A frequency mixing operation is normally performed on the radar return prior to coupling the return to the fixed frequency rejection filter to place the center of the MBC spectrum at the center frequency of the rejection filter. In the more traditional analog radar circuits, a variable frequency source such as voltage-controlled quartz crystal oscillator (VCO) is usually employed to provide the locally generated signal required in performing the mixing operation. The calibration of such an oscillator is quite critical, requiring special care in manufacturing and testing, occasional readjustment due to aging of parts and extremely well-regulated power supplies.

In more recent digital radar systems, digital techniques typically eliminate the need for a VCO of the type described. However, a considerable amount of digital hardware is required. The hardware must be capable of high operating speeds and this, coupled with the large amount of hardware, results in large power consumption. For example, closed loop control of a mixer is required in order that the system antenna output will always be at the filter frequency. Additional hardware is thus required for detection and formation of the desired closed-loop circuit. Moreover, this closed-loop circuitry and mixer may limit the dynamic range of the radar processor at its input.

OBJECTS AND SUMMARY OF THE INVENTION

It is therefore an object of the present invention to provide a novel method and a radar receiver in which clutter is eliminated in the radar processor.

It is a more specific object of the present invention to provide a novel method and radar processor in which target detection and clutter blanking functions are multiplexed.

It is also an object of the present invention to provide a novel radar receiver and method for performing clutter cancellation functions in which the traditional canceller circuit is eliminated.

It is another object of the present invention to provide a novel radar receiver of the type described having improved dynamic range.

It is also a specific object of the present invention to provide a novel method and radar receiver of the type described in which a variable frequency oscillator in a local oscillator circuit is not required for conversion of radar returns to a clutter filter frequency.

Briefly stated, in accordance with the present invention there is provided a radar circuit in which returns are coupled directly from an intermediate frequency stage to a radar processor without a canceller stage interposed therebetween. Target processing and clutter processing functions are multiplexed in the radar processor, and outputs indicative of the position of clutter in the frequency domain are utilized to blank periods of clutter from the output indicative of target returns.

BRIEF DESCRIPTION OF THE DRAWINGS

The foregoing objects and advantages are accomplished in accordance with the present invention as will hereinafter become apparent to one skilled in the art to which the invention pertains from a perusal of the following description when read in conjunction with the attached drawings in which.

DESCRIPTION OF A PREFERRED EMBODIMENT

Figure 1:
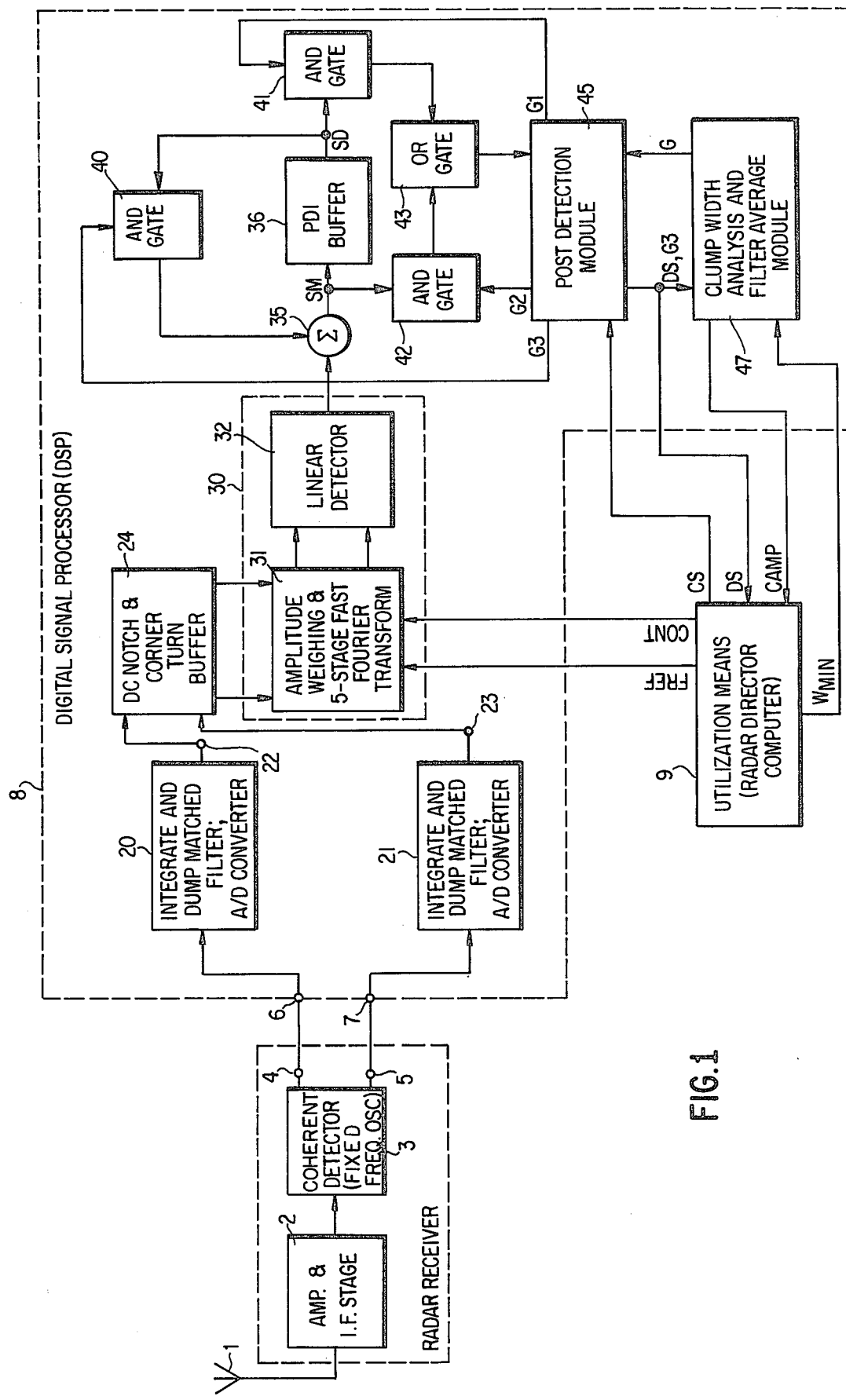
FIG. 1 is a functional block diagram of a radar receiver operable in accordance with the present invention.
Figure 1A:
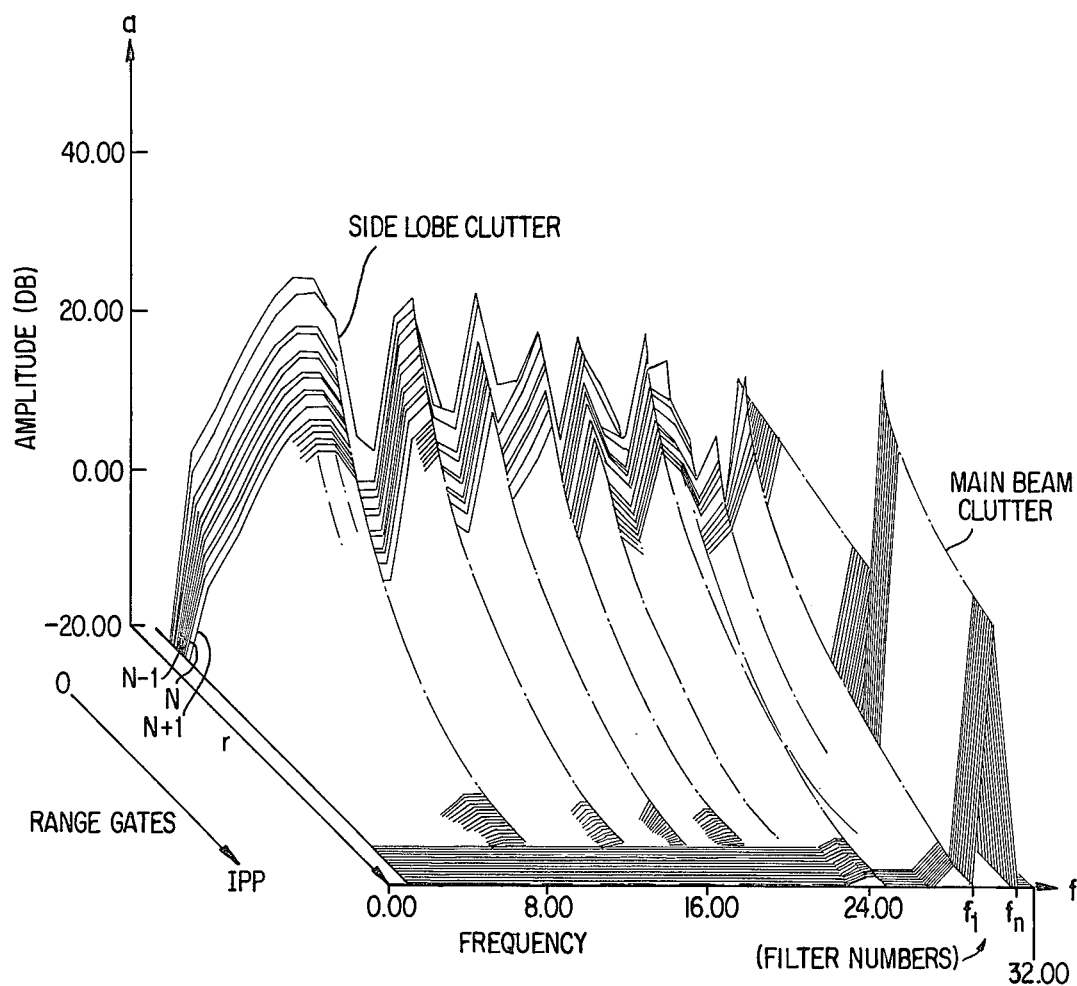
FIG. 1A is a three-dimensional matrix illustrative of range gates.

Referring to FIG. 1 there is illustrated a radar receiver constructed in accordance with the present invention. The description of the receiver of FIG. 1 is directed toward the explanation of achieving the following operational objectives. The total radar returns are separated into range gates each of which undergoes a frequency analysis. This results in a three-dimensional matrix illustrated in FIG. 1A. In FIG. 1A, and "$r$" axis represents time (range gates). An "$f$" axis corresponds to frequency (doppler filters). An "$a$" axis corresponds to the amplitude of the return for each filter-range gate set. This data matrix contains all the returned energy including the ground returns from the main lobe (main beam clutter MBC) and target returns. Target detection capability is greatly enhanced if the MBC returns can be removed (rejected) prior to target detection processing. Since the MBC frequency spectrum is not prepositioned in the doppler frequency domain and the range to clutter relationship is an unknown variable, postprocessing is required. This processing utilizes the doppler filter and amplitude data on a range gate by range gate basis to determine the range-doppler location of MBC. The doppler and/or range information resulting from the clutter processing is then used directly or indirectly for rejection of MBC from the data matrix. The remaining data is processed for target detection.

An antenna 1 provides returns to a suitable conventional radar receiver which may include, among other things, an amplifier and intermediate frequency stage 2 having an output signal supplied to a coherent detector 3. The antenna 1 may comprise a four horn monopulse antenna, a phased array or other well-known radar antenna. The intermediate frequency and amplifier stage 2 performs conventional, well-known amplification and mixing functions. The coherent detector 3 may comprise a well-known radar detector providing conventional in phase, I, and quadrature, Q, output signals at terminals 4 and 5 respectively. The output terminals 4 and 5 are respectively connected to the input terminals 6 and 7 of a digital signal processor 8 described in detail hereinafter. The digital signal processor 8 is coupled to utilization means 9 which preferably includes a radar director computer. The radar director computer may be any general purpose airborne digital computer capable of approximately 300,000 operations per second (an operation is defined as an add cycle where one operand is called from memory and added to the contents of a specified register). The utilization means provides an executive control function with long term memory for positioning gates and providing other processing parameters. The functions provided by the utilization means as applied to this invention will be defined with respect to specific processing hardware of FIGS. 1 and 2. The utilization means 9 may further include conventional display means.

Referring now to the invention in greater detail, it is noted that while the coherent detector 3 is conventional, prior analog detectors 3 used in this type of system typically require a variable frequency second local oscillator. Corresponding circuitry is also typically required in a digital radar receiver. The coherent detector 3 of the present embodiment in an analog form employs a fixed frequency second local oscillator. The frequencies of the local oscillators in the intermediate frequency and amplifier stage 2 and detector stage 3 are chosen in the preferred form to provide a d.c. output, i.e., a base-band frequency spectrum with the center frequency $f_o$ positioned at d.c., at the terminals 4 and 5.

The processor input terminals 6 and 7 are respectively connected to integrate and dump matched filters and analog to digital converters 20 and 21. The circuits 20 and 21 each receive the video signal from the associated input terminal and integrate the detected return for application to the included analog to digital converters. Consequently, digital output signals indicative of the I and Q return signals are provided at respective output terminals 22 and 23 of the circuits 20 and 21. The terminals 22 and 23 are connected to a buffer 24, which may comprise a suitable memory for loading data into a programmable module 30. The programmable module 30 includes an amplitude weighing and five stage, Fast Fourier Transform (FFT) stage 31 having its input terminals coupled to the buffer 24. The stage 31 is a well-known processing circuit utilizing algorithms to generate three-dimensional matrix information indicative of amplitude versus doppler frequency for successive range gates which, when detected by a conventional linear detector 32, provides output data matrices as illustrated in FIG. 1A. The stage 31 is also shown as having an input from the utilization means 9. This input may be utilized to update well-known processing equations performed by the stage 31.

The stage 31 comprises, for example, thirty-two filters for processing returns sampled over a halflook period such as thirty-two interpulse periods. The number of interpulse periods in a look period is a matter of design choice. The in phase and quadrature output signals from the stage 31 are coupled to a linear detector 32 having its output signal coupled to one input terminal of an adder 35. The sum output signal SM from the adder 35 is applied to a post detection integrator (PDI) buffer 36 having an output signal SD coupled through an AND gate 40 to a second input terminal of the adder 35. The signal SD is also applied to an AND gate 41 and the output signal from the AND gate 41 is applied to one input terminal of an OR gate 43. The output signal from the adder 35 is also coupled through an AND gate 42 to another input terminal of the OR gate 43 and the output signal from the OR gate 43 is supplied to the post detection module 45. The gating input signals applied to the gates 40, 41 and 42 are illustrated and described hereinafter in greater detail in connection with FIG. 3.

Figure 2:
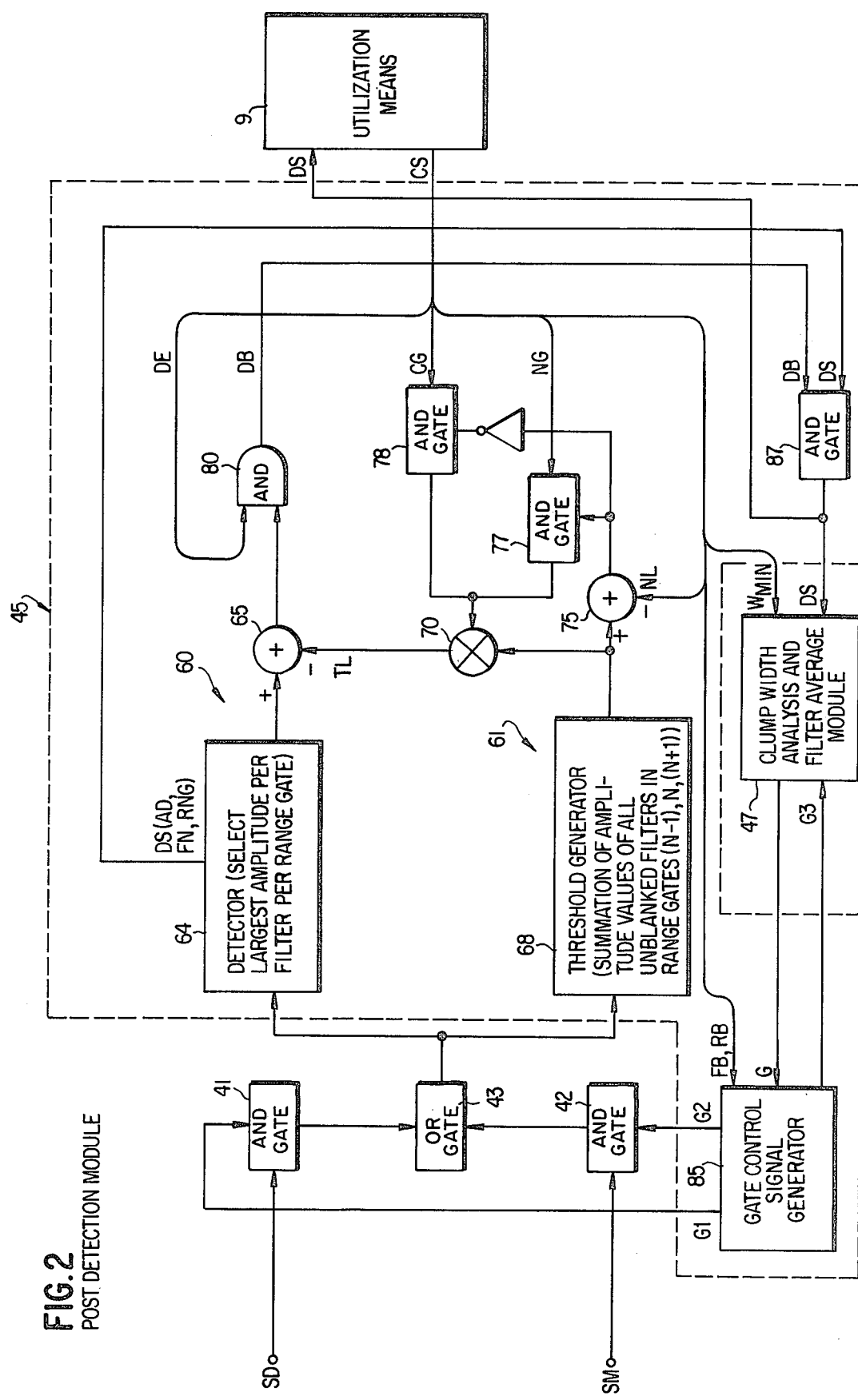
FIG. 2 is a more detailed functional block diagram of the post detection module of the circuit of FIG. 1; and, FIGS. 3a through 3f inclusive represent timing diagrams illustrative of the operation of a radar receiver constructed in accordance with the present invention.

The post detection module 45 functions to process the output signals from the buffer 36 during the first half-look portion of the next look period, i.e., the N-1 outputs are processed during look N (see FIG. 3). When SM outputs are taken directly from adder 35 the function is to process and detect mainbeam clutter frequency. During the first halflook period of the next look period, the post detection module 45 functions to process the output from the PDI buffer 35 to detect targets using the results from the clutter frequency detection to blank the mainbeam return spectrum. A data output signal DS and the gating signal G3 from the post detection module 45 are supplied to a clump width analysis and filter averaging module 47 which provides a control signal to the post detection module 45 as illustrated in FIG. 2. The data signal DS is also supplied to the utilization means 9 together with a clutter amplitude signal CAMP from the module 47. The utilization means supplies control and data signals CS to the post detection module 45 and also supplies a minimum clump width value $W_{min}$ to the module 47.

Referring now to FIG. 2, the post detection module 45 is illustrated in greater detail. The same reference numerals correspond to elements illustrated in FIG. 1. The gate 43 is connected to an amplitude processing channel 60 and to a threshold processing channel 61. The gate 43 supplies an output signal to a detector 64 in the amplitude processing channel which provides an amplitude indicative of the highest value of a return level to an adder 65 or other suitable amplitude comparison circuit. A threshold generator 68 receives the signal from the gate 43 and, together with additional circuitry in the threshold channel 61, provides a threshold level TL to the minus input terminal of the adder 65. The threshold generator 68 may be a conventional circuit for providing a summation of amplitude values of all unblanked filters in range gates $N-1$, N and $N+1$, where N is the number of a particular range gate being processed in channel 60. The blanking of filters is explained below.

The output signal from the threshold generator 68 is coupled to a multiplier 70 which provides the threshold level input signal TL to the adder 65. The multiplier 70 multiplies the signal from the threshold generator 68 by a factor proportional to noise level (NL), noise gain (NG) and the clutter gain (CG). The multiplying factor is generated as follows. An adder 75 having an adding or plus input terminal connected to the output terminal of the generator 68 provides output signals to gates 77 and 78 for gating to the multiplying factor input terminal of the multiplier 70. A noise level signal NL is coupled to a subtracting or minus input terminal of the adder 75 from the utilization means 9, and the utilization means 9 also controls gating of the noise gain gate 77 and clutter gain gate 78. Consequently, returns over a threshold, i.e., those indicative of a target, are coupled from the output of the adder 65, and are gated by a gate 80 to provide a detected bit output signal DB to the utilization means 9. A detecting enabling input signal DE is provided to the gate 80 from the utilization means 9 also.

The gates 41, 42 and 40 are enabled by means of output signals G1, G2 and G3, respectively, supplied from a gate control signal generator 85 in response to signals from the module 47. The gate control signal generator 85, in essence, determines when the gates 41 and 42 pass returns indicative of a clutter halflook or target halflook in response to an input signal from a gate 87 interposed between the gate 80 and the module 47. The signal G3 may be that illustrated in FIG. 3B and may merely gate the signal SD to the adder 35 during an appropriate halflook period.

Operation

The operation of the system of the present invention is described with reference to FIGS. 1, 2 and 3. In FIG. 3, the abscissa is time. FIG. 3A represents one look period. A look period is one period of constant pulse repetition frequency of the radar set. A look period N initiated at time $t_0$ and comprising, for example, seventy interpulse periods (IPP) is illustrated. As shown in FIG. 3B, the look period N comprises two halflook periods and also defines the halflook gating signal G3. FIG. 3C illustrates the component of each halflook period, namely a relatively brief dead time, e.g., a blank period of three IPP's extending from time $t_0$ to time $t_1$, and a period of valid returns from time $t_1$ to time $t_3$ in the first halflook period. In the second halflook period, a dead time of three IPP's is provided from time $t_3$ to time $t_4$ and a period of valid returns is provided from time $t_4$ to time $t_6$. FIGS. 3D and 3E, respectively, illustrate the timing of the loading and reading of the buffer 24 (FIG. 1) while FIG. 3F illustrates the timing of the output signals from the gate 43.

As is shown in FIG. 1, incoming returns or echoes are received by the antenna 1, converted by the amplifier and intermediate frequency stage 2 and resolved by the coherent detector 3 into the in-phase and quadrature components I and Q. The resultant base band frequency spectrum of the signals at the output terminals 4 and 5 has the zero doppler frequency $f_0$ positioned at zero frequency as represented by zero volts d.c. Of course, the position of MBC varies within the base band frequency spectrum as a function of aircraft velocity and line-of-sight angle.

During each halflook period, the circuits 20 and 21 provide digital representations of the I and Q components of detected return and load these digital representations into the buffer 24 for coupling to the processing module 30. The timing of the loading of the buffer 24 for each halflook period is denoted "load buffer 1" and "load buffer 2" in FIG. 3D. As stated above, in the present exemplification, the buffer 24 stores signals indicative of returns over 32 interpulse periods. The result is a stored matrix of digital data representing signal return amplitude over each halflook period as a function of range for several time samples or range gates within an interpulse period and for a number of successive interpulse periods. Thus, the stored matrix of digital data provides a time history of return signal amplitude at a plurality of ranges for a plurality of interpulse periods.

The data matrix gathered during the first halflook period is applied to the processing module 30 during the time period $t_3$–$t_5$, i.e., during the time period denoted "read buffer 1" in FIG. 3E. As the data matrix for the first halflook period is read from the buffer 24, this data is processed by the processor 30 to provide a data matrix substantially as shown in FIG. 1A.

After a dead time $t_3$–$t_4$, the I and Q channel signals are stored by the buffer 24 during the time period $t_4$–$t_6$, i.e., during the time period denoted "load buffer 2," to form a three-dimensional data matrix for the second halflook period. The data matrix for the second halflook period is thereafter read as denoted by the "read buffer 2" designation of FIG. 3E and is processed by the processor 30.

Processing of the I and Q channel signals by the processor 30 to form the type of data matrix shown in FIG. 1A may be accomplished in any suitable conventional manner. The amplitude weighing and 5-stage FFT circuit 31 may, for example, perform a doppler frequency analysis of the I and Q channel signals through a conventional Fourier transform technique to provide doppler frequency information in relation to the range and amplitude information already contained in the data from the buffer 24. To provide absolute, positive amplitude information, the square root of the sum of the squares of the I and Q channel signals may be calculated through any suitable, well-known estimation technique and the linear detector 32 may provide absolute amplitude information as a function of range (discrete range gates) over the doppler frequency range of interest (FIG. 1A). The weighing factors and integration constants as well as a frequency reference value required to perform the frequency analysis may be supplied from the utilization device 9 and are well known parameters required for Fourier transforms. Several well known weighing factor functions may be used depending on data block sizes and discrete frequency filter characteristics desired from the Fourier transform. The weighing function provided by the utilization means 9 for use in connection with the present embodiment of this invention is a Dolph-Chebycheff function with equal sidelobes and a ratio of main lobe to sidelobe of 80 decibels.

The processed data matrices for the first and second halflook periods are applied sequentially through the adder 35 to the PDI buffer 36. As the processed data matrix for the second halflook period is applied through the adder 35 to the PDI buffer 36, the gate 40 is enabled by the G3 gating signal and the processed data matrix for the first halflook period is applied to the adder 35. The output signal from the adder 35 is thus the sum of the processed data matrices gathered during the first and second halflook periods. This sum signal from the adder 35 is stored by the PDI buffer 36 for application through the gate 41 to the post detection module 45 as the SD signal during the first halflook of the next look period.

When the gate 40 is enabled by the halflook gate signal G3 during look N+1 'to sum the processed data matrices for the first and second halflook periods of the look period N, the gating signal G2 controls the gate 42 to apply the sum signal for all unblanked filters to the post detection module 45. As is illustrated in FIG. 2, the unblanked portion of the sum signal applied through the gate 42 precedes the unblanked sum signal applied from the PDI buffer 36 through the gate 41 and is utilized to generate a threshold voltage. The threshold voltage is developed by the threshold channel 61 and is then utilized as a comparison voltage in the amplitude channel 60 for target processing during the second halflook period of the look period N+1 (the target processing period).

The utilization means 9 and the gates 40, 41, 42, 80 and 87 act as timing and synchronizing means to establish a clutter processing period for look period N during the second halflook period and a target processing period for look period N during the first halflook period of look period N+1. Location of clutter in the doppler frequency domain is determined by first establishing the identities of the range gate filters which are contributing clutter to the data signals provided from the buffer 24. Once the identities of the range gate filters are established, their contributions to the output can be inhibited or blanked by appropriate signals to the gates 41 and 42 during the target processing period following the clutter processing period. The utilization means 9 stores the output indicative of clutter location for the purpose of blanking input signals to the post detection module PDM during the target analysis period. Consequently, by the operation described below, clutter is eliminated from the target detection process.

With continued reference to FIG. 2, the amplitude channel 60 incorporates the function of filter blanking utilizing the gate 41 and also selects the largest amplitude per filter within each range gate. The gate 41 is disabled during the clutter analysis phase by the halflook gating signal G1 from the gate control signal generator 85. Processing by the threshold channel 61 includes filter blanking, computing a range-on blanking filter average, and the development as explained above of a threshold level TL for coupling to the subtracting input of the adder 65. During the clutter analysis period, the doppler filter blanking is disabled, and the range-doppler average is computed as the amplitude summation over 96 filters. The number 96 in the present exemplification is determined by the selection of thirty-two filters which are processed and by the use of three range gates for computing centroid about the particular range gate under consideration.

The adder 75 compares the computed "average" from the circuit 68 against a thermal noise level "constant" NL from the utilization means 9. The output signal from the adder 75 is coupled to both the gate 77 and through an inverter to gate 78. Depending upon the results of the comparison by the adder 75, either noise gain NG or clutter gain CG is used to modify the average from the circuit 68 to obtain the threshold level TL for the adder 65. Thus the subtracting input to the adder 65 is, in effect, compared with the output of the amplitude module 64 to determine the presence of returns greater than noise, for example, targets. For range gates in which the amplitude in channel 60 exceeds the threshold level, a valid target detection has occurred. Provision may be included in the post detection module 45 for forcing a variable number of consecutive range gates to be either excluded or forcibly detected by means of modifying the subtracting input to the adder 65.

It is significant to note that the post detection module 45 provides detection capability for each individual range gate. Additional processing is required to separate the main beam clutter return from competing returns such as the altitude line or valid targets. This is performed by capturing of the data within the largest number of consecutive detected range gates in the amplitude channel 60. The number of consecutive range gates, or clump width is compared in the module 47 against a minimum width "constant" $W_{min}$. When the minimum is exceeded, the clump width module 47 provides a gating output signal G to the gate control signal generator 85 to control the application of the SM and SD signals to the post detection module 45 as was previously described. Specifically, it was previously mentioned that gate 41 is disabled and gate 42 is enabled during the second halflook of a look period so that clutter can be located using the SM signal supplied through the gate 42. The presence of clutter at a specific location is indicated when the minimum width is exceeded. Thus, for example, the clutter may be indicated as being located in the middle of the halflook of data. Thereafter, this clutter location information may be used as previously indicated to control the gating of gates 41 and 42 for various purposes. As was previously mentioned, for example, the gating of gate 41 by the signal G1 may be modified in response to the clutter location information (e.g. the gate 41 may be inhibited by momentarily blocking the enabling signal G1) so that clutter is prevented from entering the post detection module during the target analysis period. Similarly, so that only clutter information will be considered when determining clutter gain or threshold levels, the output signal G applied to the control signal generator 85 may enable the gate 42 only during the presence of clutter previously located so that only during such interval the gate 42 will apply an input to the threshold channel 61. The average filter number FN, the largest detected amplitude DA and corresponding range gate and filter number RNG are also available as output signals from the detector 64 by way of the gate 87 for use by utilization means 9 for other radar control functions. The average detected filter value defines the center of the main beam clutter filter interval to be blanked in the post detection module 45 where target processing of a particular "look's" data matrix also occurs. It is this operation that replaces the use of a variable frequency oscillator in the detector 3.

Further advantage of the interaction of the modules 36, 45 and 47 is achieved by utilizing the flexibility offered by the control of the above-described variables provided by the utilization means 9. Consequently, programs may be implemented for the utilization device 9 which provide clutter automatic gain control in response to the largest clutter amplitude signal CAMP from the clump width analysis and filter number module 47. Additionally, clutter frequency and range tracking may be implemented by the utilization means or dedicated hardware if closed looped operation is desired. Target processing is very similar to that of clutter processing, since as described above, they are multiplexed.

What is thus provided is a radar receiver in which main beam clutter is reliably eliminated by means of multiplexing clutter returns and target processing signals in a post detection module. One local oscillator which is phased and amplitude stable may be used for generating all reference frequencies in the system. A particular benefit of the present system is that rejection of main beam clutter may be achieved without requiring a closed-loop tracker or any knowledge of the aircraft's ground speed.

The following chart briefly summarizes the signal flow and processing accomplished by the system of the present invention.

| LOOK PERIOD | HALFLOOK | OPERATION PERFORMED |
| --- | --- | --- |
| N | 2 | Gate 40 enabled, SM to PDI Buffer |
| | | Gate 42 enabled, SM(N) to PDM 45 for clutter |
| | 1 | SM to PDI Buffer, Gate 41 enabled, SD(N) to PDM 45 for target locating. |
| N + 1 | 2 | Gate 40 enabled, SM to PDI Buffer |
| | | Gate 42 enabled, SM(N+1), to PDM 45 for clutter values |
| N + 2 | 1 | SM to PDI Buffer, Gate 41 enabled, SD (N+1) to PDM 45 for target locating. |

Further, it will be appreciated by one skilled in the art that the storage and other functions performed by the utilization device may be conventionally provided by a hard wired or programmable device. One programmable system specifically implemented for operation in conjunction with the digital signal processor of FIG. 1 is disclosed fully in U.S. patent application Ser. No. 672,891, filed Apr. 1, 1976 of Heller et al. for Digital Radar Control System and Method, filed concurrently herewith. The Heller et al application is assigned to the assignee of the present invention and is hereby incorporated herein by reference.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a doppler radar receiver including a processor for producing in-phase and quadrature components of returned signals, a system for removing main beam clutter from radar returns comprising:
    a buffer memory for storing signals received from range gate filters during first and second portions of a look period and for providing a first and a second digital data signal representative of the signals stored during the respective first and second portions of the look period;
    processing means operatively connected to said buffer memory for successively processing the first and second data signals from said buffer memory in accordance with a radar processing algorithm to provide respective first and second data matrices representing return signal amplitude as a function of range for a plurality of doppler frequencies;
    means for summing the data matrices from said processing means for two different halflook periods;
    a post detection module;
    gating and synchronizing means coupled to said summing means for establishing a clutter processing period corresponding to the first portion of the next look period, and a target processing period corresponding to a second portion of a next look period, said gating and synchronizing means supplying to said post detection module during said clutter processing period an output indicative of the first data signal, and said gating and synchronizing means supplying to said post detection module during said target processing period an output indicative of the sum of the first and second data signals;
    said post detection module including an amplitude channel for selecting the largest amplitude from range gate filters and a threshold channel for summing values of a data signal and said post detection module further including means for comparing the outputs of said amplitude channel and said threshold channel,
    whereby said post detection module provides outputs indicative of the location of main beam clutter in the doppler frequency domain,
    means for storing the outputs of said post detection module, and
    means coupling the stored outputs of said post detection module to said gating and synchronizing means for inhibiting inputs, to said post detection module during said target processing period, whereby main beam clutter is blanked from radar returns.

2. The receiver of claim 1 in which said means for storing comprises a radar director computer.

3. The receiver of claim 2 in which said post detection module further comprises a multiplier coupled between said threshold channel and said means for comparing, said radar director computer having inputs indicative of noise gain and clutter gain coupled to said multiplying means, whereby automatic gain control is provided.

4. In a radar system receiver, a signal processor for eliminating clutter comprising:
    means for successively storing first and second signals respectively indicative of radar returns received during first and second portions of a look period, the look period comprising a plurality of radar interpulse periods;
    means for combining said first and second signals;
    a post detection module coupled to undelayed and delayed signals from said storing means to an amplitude channel and a threshold channel in said post detection module, means for comparing signals in said amplitude and threshold channels during a first, clutter processing portion of a look period, whereby the location of clutter in the doppler frequency domain is determined, and means for disabling the coupling of said signals to said amplitude and threshold channels during a second, target processing portion of a look period at locations in the doppler frequency domain corresponding to the determined locations of clutter.

5. The receiver according to claim 4 wherein said disabling means comprises first and second gating means for disabling inputs to said post detection module during alternative halflook period.

6. The receiver of claim 4 further comprising a detector having a fixed frequency local oscillator for generating said first and second indicative signals in response to said radar returns.

7. A method for processing radar return signals in a pulsed doppler radar system so as to eliminate clutter and locate targets comprising the steps of:
    receiving radar return signals for a plurality of interpulse periods of the radar system;
    converting the received radar return signals into a plurality of digital signals each representing an amplitude of return energy received in a predetermined range bin, each range bin including a digital signal for each of said plurality of interpulse periods;
    processing the plurality of digital signals in accordance with a predetermined frequency transform to convert the digital signals into the frequency domain;
    summing the processed, frequency domain signals in a first half of a predetermined look period with the processed, frequency domain signals in a second half of the look period;

detecting the locations and approximate centers of clumps of signals exceeding a clutter threshold and a minimum width in response to the sum signal during the second half of the look period;

gating the sum signal subsequent to the detecting step to remove the detected clumps of signals that exceed said clutter threshold and said minimum width; and processing the gated sum signal in a half of a look period subsequent to said predetermined look period in order to locate targets.

* * * * *